US012612996B2

(12) United States Patent
Lin

(10) Patent No.: US 12,612,996 B2
(45) Date of Patent: Apr. 28, 2026

(54) WALL MOUNT ASSEMBLY AND WALL MOUNT BRACKET

(71) Applicants: INVENTEC (PUDONG) TECHNOLOGY CORPORATION, Shanghai (CN); INVENTEC CORPORATION, Taipei City (TW)

(72) Inventor: Hua-Wei Lin, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 215 days.

(21) Appl. No.: 18/431,604

(22) Filed: Feb. 2, 2024

(65) Prior Publication Data

US 2025/0155076 A1     May 15, 2025

(30) Foreign Application Priority Data

Nov. 14, 2023    (CN) .......................... 202311517919.3

(51) Int. Cl.
F16M 11/04 (2006.01)
F16M 13/02 (2006.01)
(52) U.S. Cl.
CPC .......... F16M 13/02 (2013.01); F16M 11/041 (2013.01)
(58) Field of Classification Search
CPC .............................. F16M 13/02; F16M 11/041
USPC ........................................ 248/222.11, 221.12
See application file for complete search history.

(56) References Cited

U.S. PATENT DOCUMENTS

| | | | | |
|---|---|---|---|---|
| 3,392,848 | A | * | 7/1968 | McConnell ............ A47B 57/50 248/221.12 |
| 4,141,108 | A | * | 2/1979 | Busse ................... E05D 5/0276 411/57.1 |
| 4,558,839 | A | * | 12/1985 | Kaplan .................. F16M 13/02 248/221.12 |
| 4,783,034 | A | * | 11/1988 | Ostrander ............... F16B 21/09 248/223.21 |
| 4,893,777 | A | * | 1/1990 | Gassaway ........... E05B 73/0082 211/8 |
| 5,427,412 | A | * | 6/1995 | Staniszewski .......... B60R 22/24 297/483 |
| 5,778,804 | A | * | 7/1998 | Read ..................... F16B 5/0692 248/221.12 |
| 5,845,795 | A | * | 12/1998 | Mulholland ......... A47B 47/027 248/221.12 |
| 6,595,379 | B1 | * | 7/2003 | Powell .................... F16B 21/09 403/321 |

(Continued)

*Primary Examiner* — Bradley Duckworth
(74) *Attorney, Agent, or Firm* — Maschoff Brennan

(57) ABSTRACT

A wall mount assembly includes a device and a wall mount bracket. The device includes a first positioning structure. The wall mount bracket includes a first bracket, a second bracket and a blocking member. The second bracket is connected to the first bracket. The second bracket includes a second positioning structure. The blocking member is disposed on the first bracket. The first positioning structure is movably disposed on the second positioning structure. When the device is located at a release position, the first positioning structure is detachably disposed at the second positioning structure. When the device is moved to a fixing position, the blocking member contacts the device, and the first positioning structure is engaged with the second positioning structure.

8 Claims, 7 Drawing Sheets

(56)                References Cited

U.S. PATENT DOCUMENTS

| | | | | |
|---|---|---|---|---|
| 7,637,465 | B2 * | 12/2009 | Huang | F16M 13/02 |
| | | | | 403/321 |
| 7,669,443 | B2 * | 3/2010 | Varer | E05B 73/00 |
| | | | | 109/51 |
| 8,672,150 | B2 * | 3/2014 | Chen | A47B 57/50 |
| | | | | 211/187 |
| 10,925,398 | B2 * | 2/2021 | Chen | A47B 88/43 |
| 11,452,373 | B2 * | 9/2022 | Chen | A47B 57/545 |
| 11,788,679 | B2 * | 10/2023 | Chen | H05K 7/1489 |
| | | | | 248/298.1 |
| 12,238,889 | B1 * | 2/2025 | Miao | H05K 7/1491 |
| 2011/0011997 | A1 * | 1/2011 | Cheng | H05K 5/0204 |
| | | | | 248/221.12 |
| 2013/0044411 | A1 * | 2/2013 | Zhen | F16M 11/22 |
| | | | | 361/679.01 |
| 2021/0293008 | A1 * | 9/2021 | Lin | E03C 1/06 |
| 2023/0151841 | A1 * | 5/2023 | Tsorng | F16M 13/02 |
| | | | | 248/221.12 |

* cited by examiner

WALL MOUNT ASSEMBLY AND WALL MOUNT BRACKET

CROSS-REFERENCE TO RELATED APPLICATIONS

This non-provisional application claims priority under 35 U.S.C. § 119(a) on Patent Application No(s). 202311517919.3 filed in China, on Nov. 14, 2023, the entire contents of which are hereby incorporated by reference.

BACKGROUND OF THE INVENTION

Technical Field of the Invention

The invention relates to a fixing device, more particularly to a wall mount bracket.

Description of the Related Art

In order to save space at home or in a workplace, some types of devices such as projector, stereo or router may be disposed on a hanging apparatus. A common hanging apparatus is, for example, a wall mount bracket for hanging such devices on a wall or a ceiling.

Generally, the hanging apparatus may include a fixing plate and a movable plate. After the movable plate is mounted on the fixing plate, a position of the movable plate is adjusted via screws, so that the position of the hanging device on the wall mount bracket is limited. However, conventional assembling process of the hanging device and the wall mount bracket is too complicated. Excessive operations of the screws to adjust the position of the movable plate may also easily cause damage to the screws, thereby disabling the position limitation of the hanging device. In addition, since the wall mount bracket is disposed on the wall or the ceiling, there may be a risk that the assembling tools fall from the wall or the ceiling, thereby causing an unsafety during the assembly of the wall mount assembly. Therefore, how to simply the assembling process and improve a safety of the wall mount assembly and the wall mount bracket is an important issue to be solved.

SUMMARY OF THE INVENTION

The invention provides a wall mount assembly and a wall mount bracket so as to simply the assembling process and improve a safety of the wall mount assembly and the wall mount bracket.

One embodiment of the invention provides a wall mount assembly configured to be disposed on a supporting member. The wall mount assembly includes a device and a wall mount bracket. The device includes a first positioning structure. The wall mount bracket includes a first bracket, a second bracket and a blocking member. The first bracket is configured to be disposed on the supporting member. The second bracket is connected to the first bracket. The second bracket includes a second positioning structure. The blocking member is disposed on the first bracket. The first positioning structure is movably disposed on the second positioning structure. When the device is located at a release position, the first positioning structure is detachably disposed at the second positioning structure. When the device is moved from the release position to a fixing position, the blocking member contacts the device, and the first positioning structure is engaged with the second positioning structure.

Another embodiment of the invention provides a wall mount bracket configured for a device with a first positioning structure and configured to be disposed on a supporting member. The wall mount bracket includes a first bracket, a second bracket and a blocking member. The first bracket is configured to be disposed on the supporting member. The second bracket is connected to the first bracket. The second bracket includes a second positioning structure. The blocking member is disposed on the first bracket. The first positioning structure is configured to be movably disposed on the second positioning structure. When the device is located at a release position, the first positioning structure is configured to be detachably disposed at the second positioning structure. When the device is moved from the release position to a fixing position, the blocking member contacts the device, and the first positioning structure is configured to be engaged with the second positioning structure.

According to the wall mount assembly and the wall mount bracket disclosed by the above embodiment, the head portions of the first positioning structures are engaged with the narrow portions of the second positioning structures, respectively, and the blocking portion of the blocking member contacts the side of the device. Thus, the device can be stably mounted on the wall mount bracket. Therefore, an assembling process of the wall mount assembly can be simplified. That is, an assembling process of the wall mount assembly is not required to include complicated assembling steps performed by additional assembling tools. Accordingly, a convenience of an assembly of the wall mount assembly can be improved. In addition, when the device is firmly mounted on the wall mount bracket located on the wall or the ceiling, there is no risk that the assembling tools fall from the wall or ceiling, thereby improving a safety during the assembly of the wall mount assembly.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
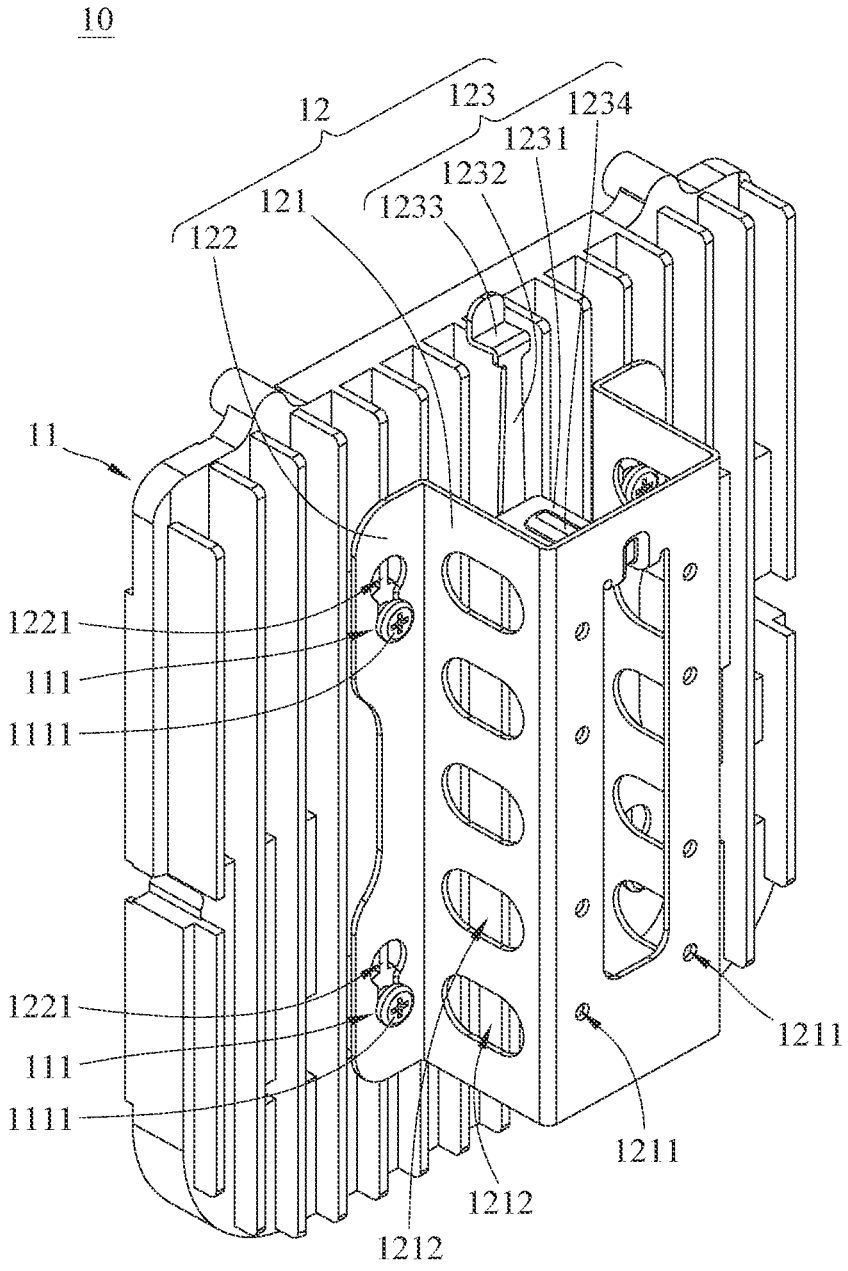
FIG. 1 is a perspective view of a wall mount assembly in accordance with one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
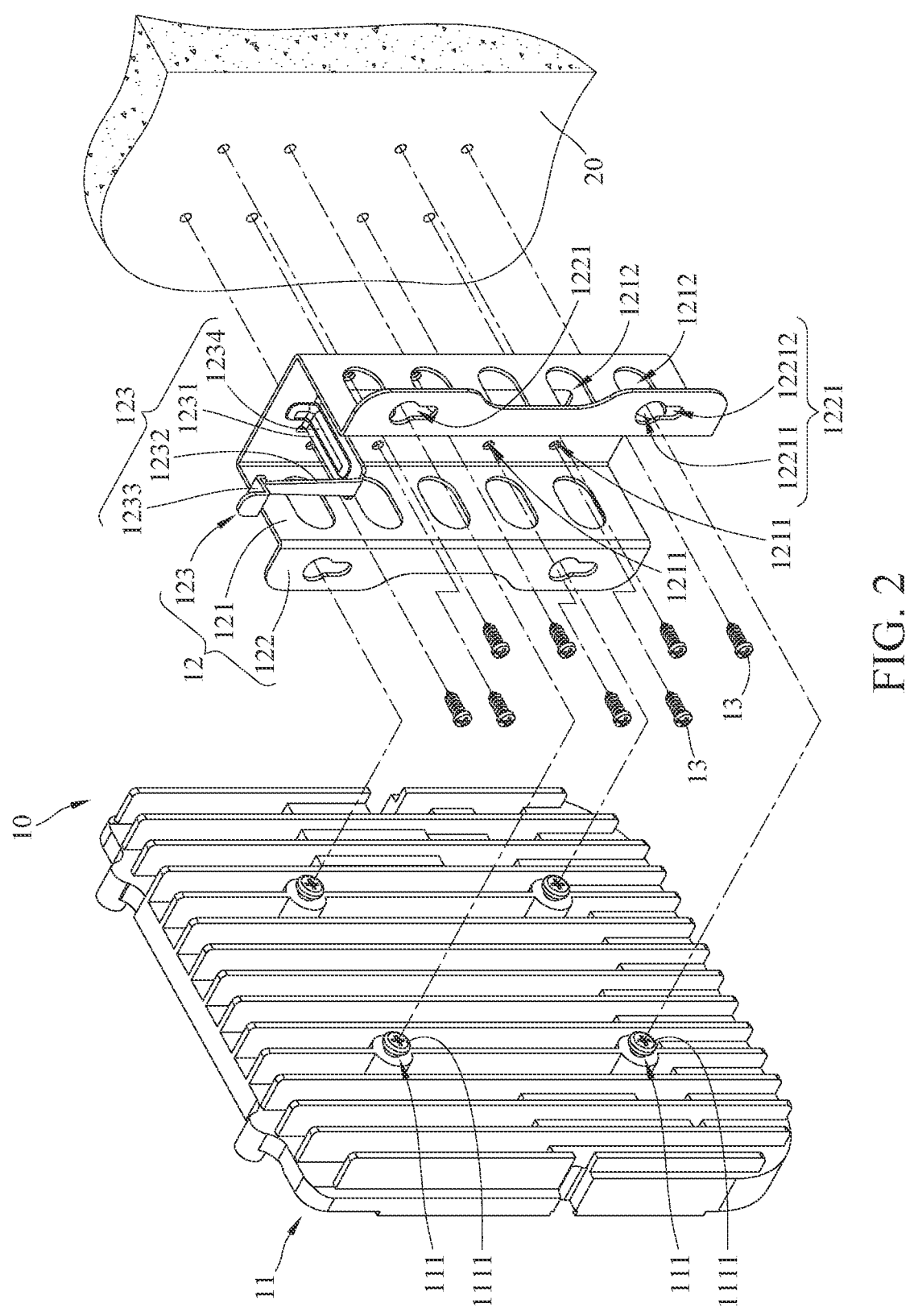
FIG. 2 is an exploded view of the wall mount assembly in FIG. 1 and a supporting member.
Figure 3:
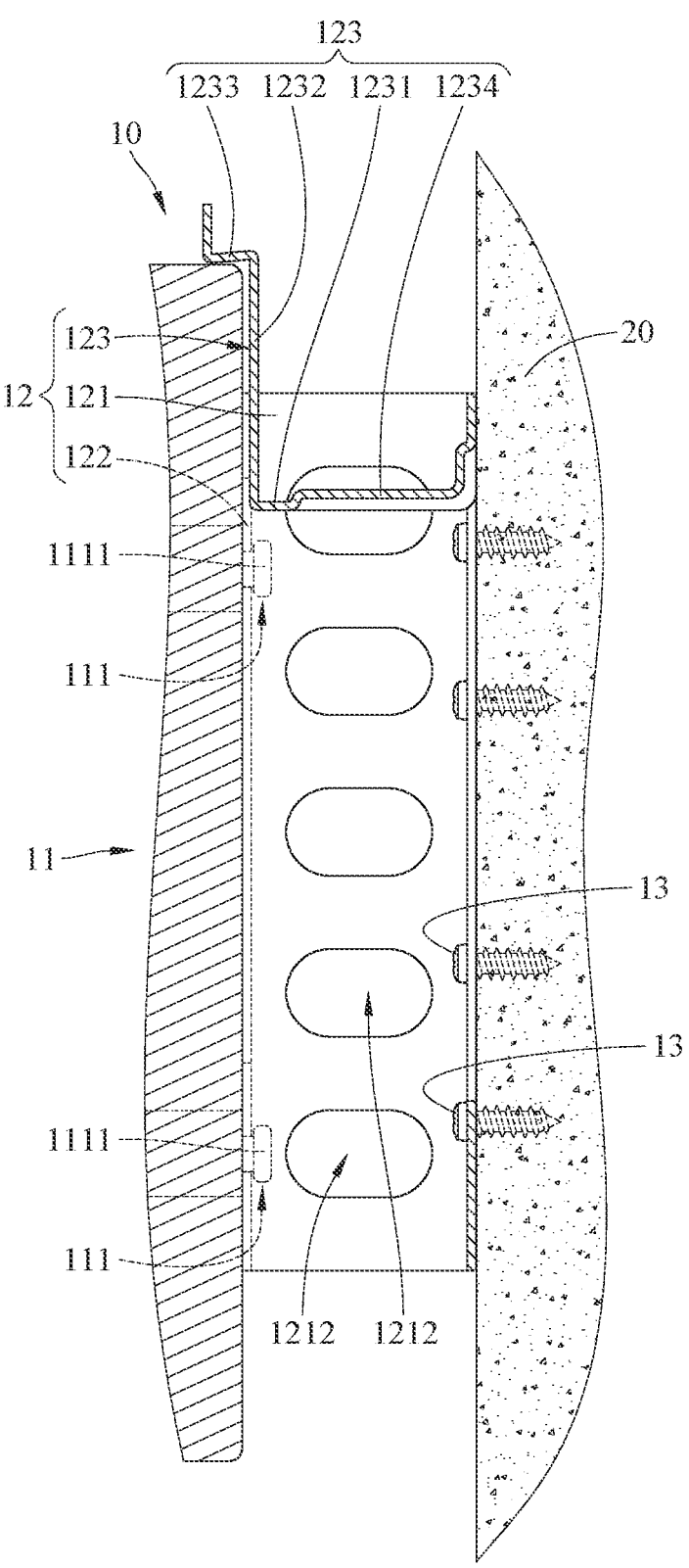
FIG. 3 is a cross-sectional view of the wall mount assembly in FIG. 1 and the supporting member.

Please refer to FIG. 1 to FIG. 3, where FIG. 1 is a perspective view of a wall mount assembly 10 in accordance with one embodiment of the invention, FIG. 2 is an exploded view of the wall mount assembly 10 in FIG. 1 and a supporting member 20, and FIG. 3 is a cross-sectional view of the wall mount assembly 10 in FIG. 1 and the supporting member 20.

In this embodiment, the wall mount assembly 10 is configured to be disposed on a supporting member 20 such as a wall or a ceiling, and includes a device 11, a wall mount bracket 12 and a plurality of fasteners 13. The device 11 is, for example, a router, and includes a plurality of first positioning structures 111. The first positioning structures 111 are, for example, bolts. Each of the first positioning structures 111 includes a head portion 1111.

The wall mount bracket 12 includes a first bracket 121, a second bracket 122 and a blocking member 123. The first bracket 121, the second bracket 122 and the blocking member 123 are, for example, integrally formed as a single piece. The first bracket 121 includes a plurality of fastening holes 1211. The fasteners 13 and the fastening holes 1211 are, for example, screws and threaded holes, respectively. The fasteners 13 are disposed through the fastening holes 1211, respectively, so that the first bracket 121 can be fixed to the supporting member 20.

The second bracket 122 is connected to the first bracket 121, and includes a plurality of second positioning structures 1221. The second positioning structures 1221 are, for example, pear-shaped holes. Each of the second positioning structures 1221 includes a wide portion 12211 and a narrow portion 12212. The wide portion 12211 is connected to the narrow portion 12212. A diameter of the head portion 1111 of each of the first positioning structures 111 is greater than a diameter of the narrow portion 12212, and is less than a diameter of the wide portion 12211.

The blocking member 123 is disposed on the first bracket 121, and includes an extension portion 1231, an elastic arm portion 1232 and a blocking portion 1233. An end of the extension portion 1231 is connected to the first bracket 121. The other end of the extension portion 1231 is connected to an end of the elastic arm portion 1232. The other end of the elastic arm portion 1232 is connected to the blocking portion 1233. The blocking portion 1233 is configured to block the device 11.

The head portions 1111 of the first positioning structures 111 are movably disposed on the second positioning structures 1221, respectively, so that the device 11 is allowed to be located at a release position or a fixing position. When the device 11 is located at the release position, the first positioning structures are detachably disposed at the wide portions 12211 of the second positioning structures 1221, respectively. At this time, the device 11 presses against the blocking portion 1233 of the blocking member 123 to bend the elastic arm portion 1232. When the device 11 moves from the release position to the fixing position, the head portions 1111 move to the narrow portions 12212 of the second positioning structures 1221, respectively. At this time, the device 11 no longer presses against the blocking portion 1233, and the elastic arm portion 1232 restores, so that the blocking portion 1233 contacts a side of the device 11, and a relative movement between the head portions 1111 and the narrow portions 12212 is restricted. That is, the head portions 1111 and the narrow portions 12212 are engaged with each other, respectively. Accordingly, the device 11 can be firmly mounted on the wall mount bracket 12.

In this embodiment, the head portions 1111 of the first positioning structures 111 are engaged with the narrow portions 12212 of the second positioning structures 1221, respectively, and the blocking portion 1233 of the blocking member 123 contacts the side of the device 11. Thus, the device 11 can be stably mounted on the wall mount bracket 12. Therefore, an assembling process of the wall mount assembly 10 can be simplified. That is, an assembling process of the wall mount assembly 10 is not required to include complicated assembling steps performed by additional assembling tools. Accordingly, a convenience of an assembly of the wall mount assembly 10 can be improved. In addition, when the device 11 is firmly mounted on the wall mount bracket 12 located on the wall or the ceiling, there is no risk that the assembling tools fall from the wall or ceiling, thereby improving a safety during the assembly of the wall mount assembly 10.

In addition, since the first bracket 121, the second bracket 122 and the blocking member 123 are integrally formed as a single piece, it is not required to produce components of the wall mount bracket 12 via additional molds, and the time for assembling the wall mount bracket 12 can be saved. Accordingly, the cost of producing and assembling the wall mount bracket 12 can be reduced.

In this embodiment, the blocking member 123 may further include a protruding structure 1234. The protruding structure 1234 is located on the extension portion 1231, and protrudes toward the blocking portion 1233. Accordingly, the structural strength of the blocking member 123 can be enhanced via the protruding structure 1234. Therefore, the blocking member 123 may not undergo permanent deformation due to an external force, so that the blocking member 123 can restore to the state of contacting the device 11.

In this embodiment, the first bracket 121 of the wall mount bracket 12 may further include a plurality of wiring holes 1212. The wiring holes 1212 are configured for cables (not shown) electrically connected to the device 11 to be disposed therethrough. In addition, a weight of the wall mount bracket 12 can be reduced via the design of the wiring holes 1212 so as to decrease the possibility for the wall mount bracket 12 to be detached from the supporting member 20 due to being overweight.

In this embodiment, the device 11 includes the plurality of first positioning structures 111, and the second bracket 122 includes the plurality of second positioning structures 1221, but the present invention is not limited thereto. In other embodiments, the device may include only one first positioning structure, and the second bracket may include only one second positioning structure.

In this embodiment, the wall mount assembly 10 includes the plurality of fasteners 13, and the first bracket 121 includes the plurality of fastening holes 1211, but the present invention is not limited thereto. In other embodiments, the wall mount assembly may include only one fastener, and the first bracket may include only one fastening hole.

In this embodiment, the blocking member 123 of the wall mount bracket 12 includes the protruding structure 1234, and the protruding structure 1234 is located on the extension portion 1231 so as to enhance the structural strength of the blocking member 123, but the present invention is not limited thereto. In other embodiments, the blocking member of the wall mount bracket may include, for example, a folding edge structure, and the folding edge structure is located on the extension portion so as to enhance the structural strength of the blocking member.

In this embodiment, the first bracket 121 includes the plurality of wiring holes 1212, but the present invention is not limited thereto. In other embodiments, the first bracket may include only one wiring hole.

Figure 4:
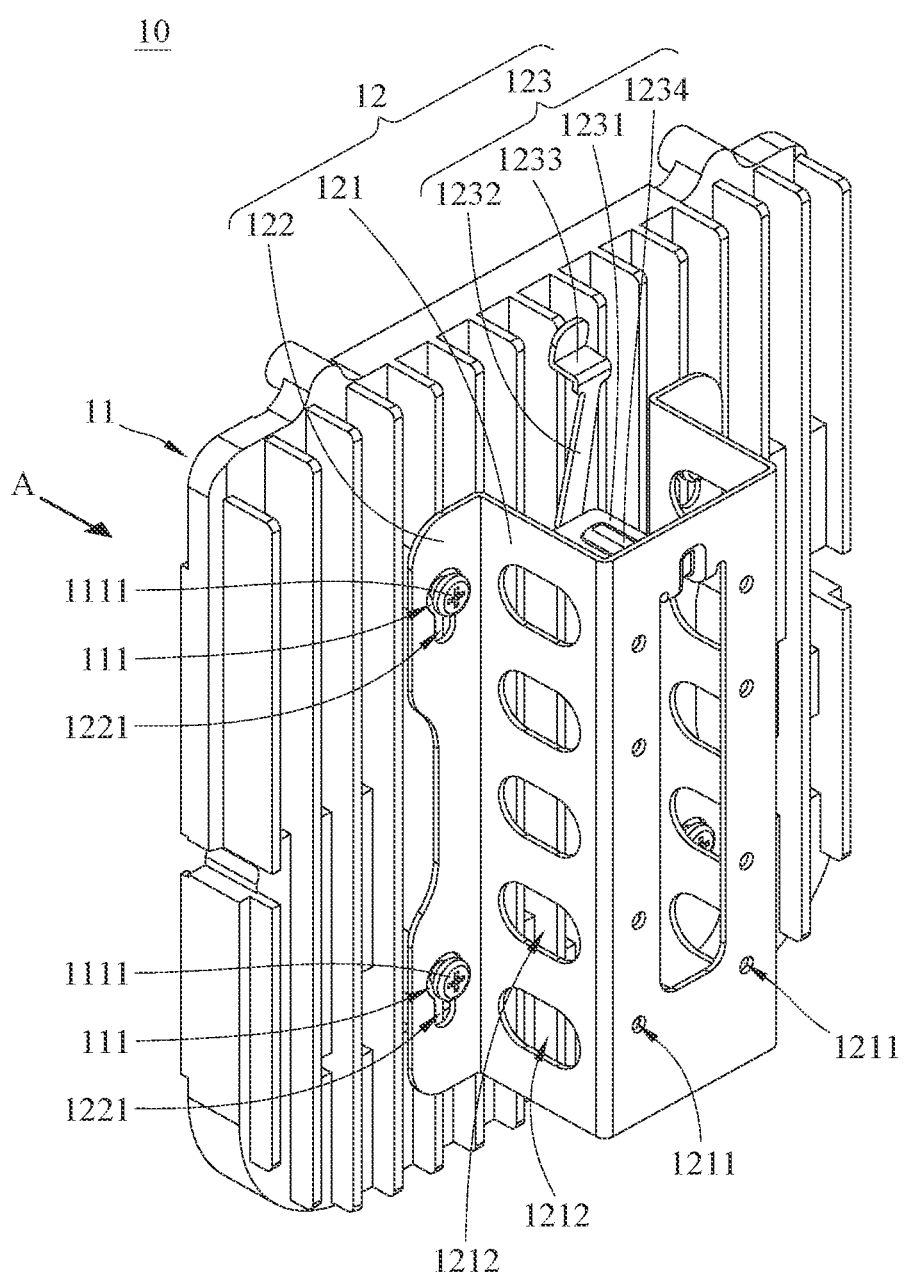
FIG. 4 is a perspective view showing that a device of the wall mount assembly in FIG. 1 is located at a release position.
Figure 5:
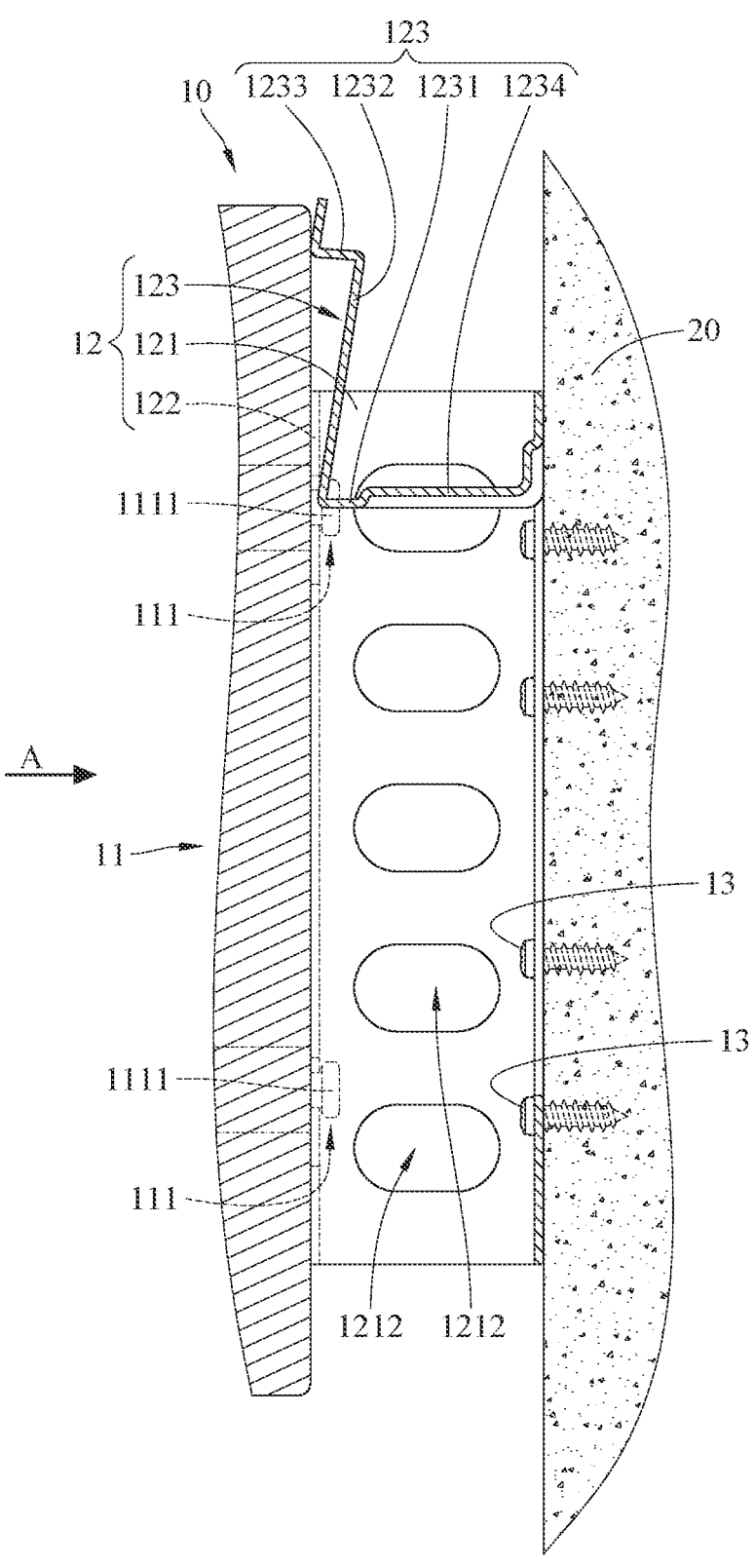
FIG. 5 is a cross-sectional view showing that the device of the wall mount assembly in FIG. 1 is located at the release position.
Figure 6:
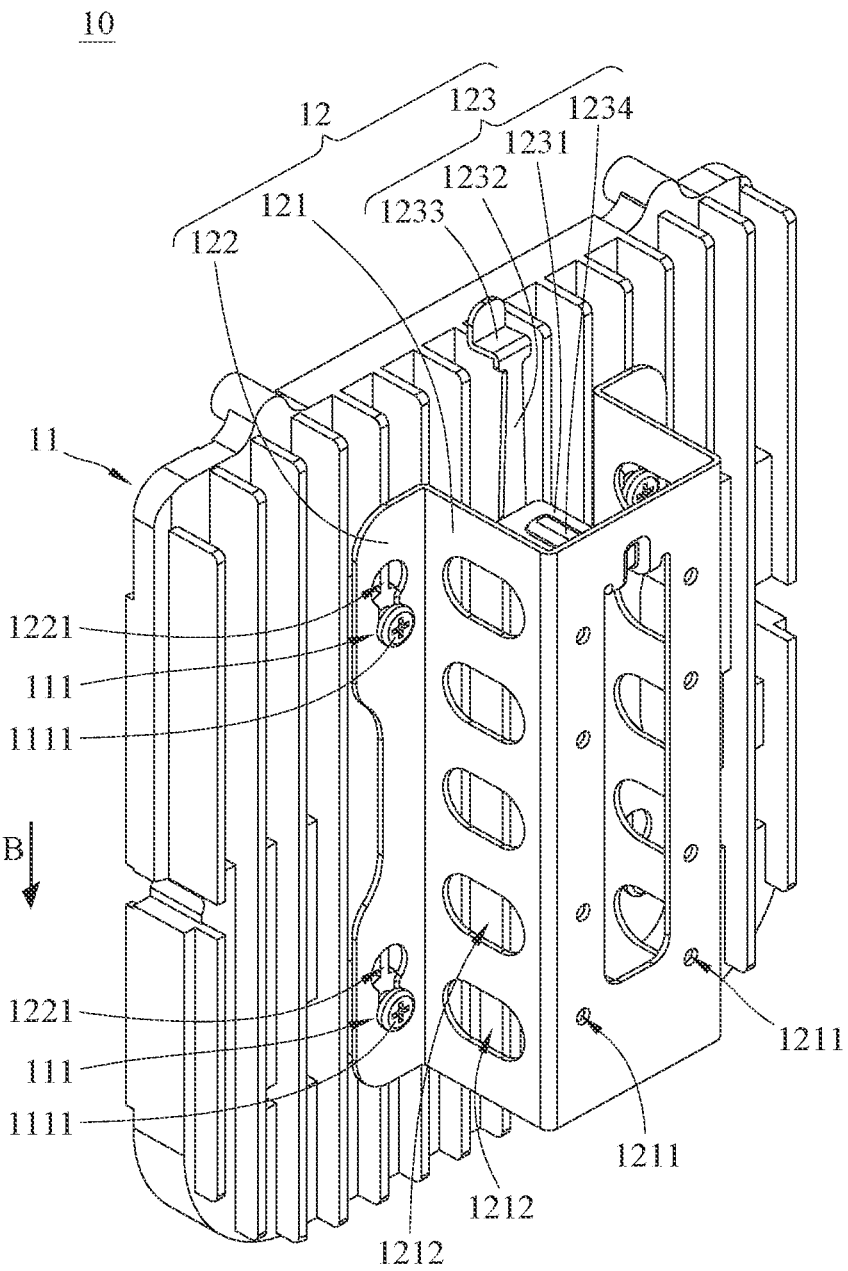
FIG. 6 is a perspective view showing that the device of the wall mount assembly in FIG. 1 is located at a fixing position.
Figure 7:
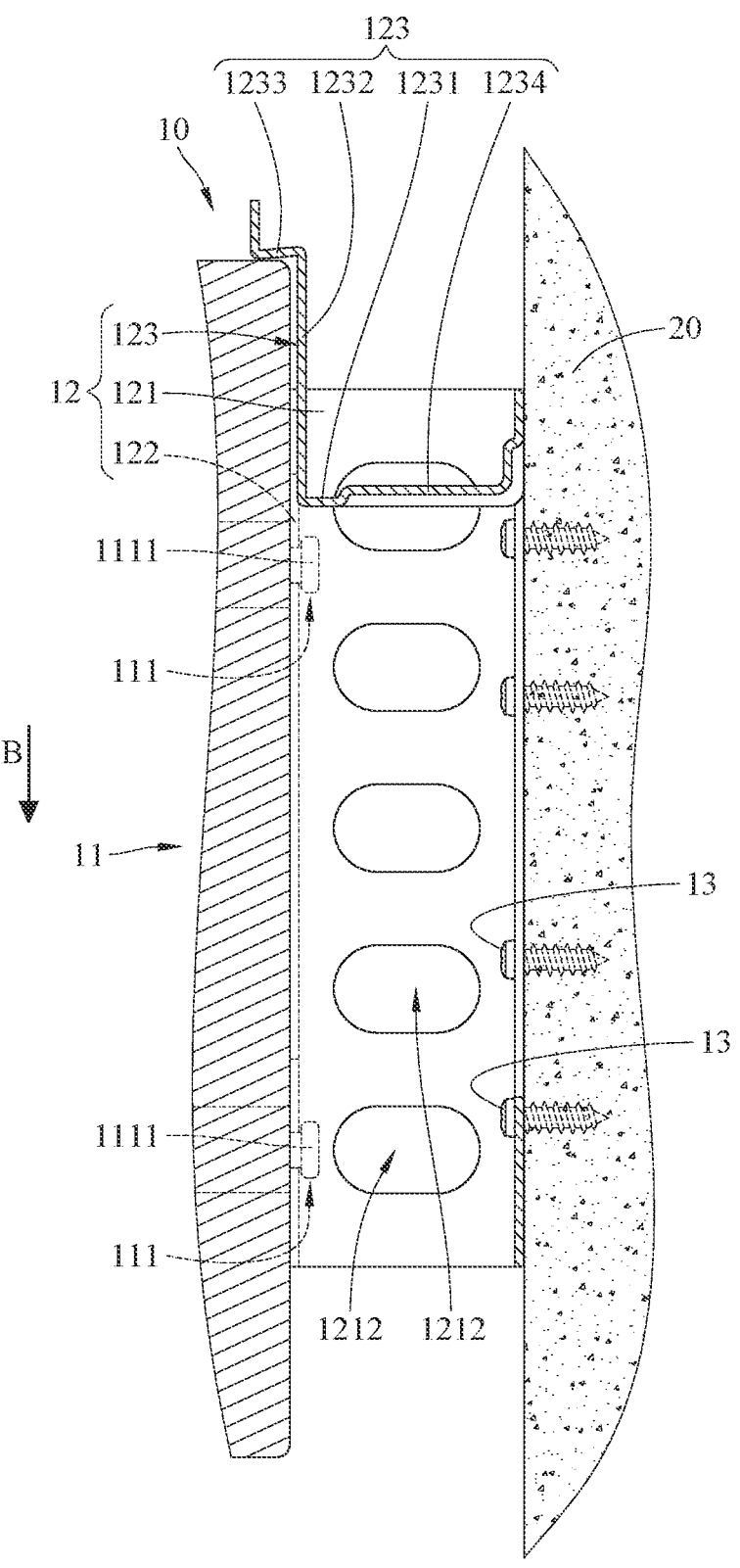
FIG. 7 is a cross-sectional view showing that the device of the wall mount assembly in FIG. 1 is located at the fixing position.

Please refer to FIG. 4 to FIG. 7, where FIG. 4 is a perspective view showing that the device 11 of the wall mount assembly 10 in FIG. 1 is located at the release position, FIG. 5 is a cross-sectional view showing that the device 11 of the wall mount assembly 10 in FIG. 1 is located at the release position, FIG. 6 is a perspective view showing that the device 11 of the wall mount assembly 10 in FIG. 1 is located at the fixing position, and FIG. 7 is a cross-sectional view showing that the device 11 of the wall mount assembly 10 in FIG. 1 is located at the fixing position.

As shown in FIG. 4 and FIG. 5, when the device 11 needs to be mounted on the wall mount bracket 12 located on the supporting member 20, firstly, the first positioning structures 111 of the device 11 are disposed on the second positioning structures 1221 of the wall mount bracket 12 along a direction A, so that the device 11 is located at the release position. At this time, the head portions 1111 are located at the wide portions 12211, respectively, and the device 11 presses against the blocking portion 1233 to bend the elastic arm portion 1232 of the blocking member 123 along the direction A.

As shown in FIG. 6 and FIG. 7, then, the device 11 is moved from the release position to the fixing position along a direction B, so that the head portions 1111 is moved from the wide portions 12211 to the narrow portions 12212 along the direction B. At this time, the device 11 no longer presses against the blocking portion 1233, and the elastic arm portion 1232 restores along a direction opposite to the direction A, so that the blocking portion 1233 contacts the side of the device 11, and the relative movement between the head portions 1111 and the narrow portions 12212 is restricted. That is, the head portions 1111 and the narrow portions 12212 are engaged with each other, respectively. Accordingly, the device 11 can be mounted on the wall mount bracket 12.

On the contrary, when the device 11 needs to be detached from the wall mount bracket 12, firstly, the elastic arm portion 1232 is bent along the direction A, so that the blocking portion 1233 is detached from the side of the device 11, and the relative movement between the head portions 1111 and the narrow portions 12212 is released. Then, the device 11 is moved from the fixing position to the release position along a direction opposite to the direction B. At this time, the head portions 1111 is moved from the narrow portions 12212 to the wide portions 12211 along the direction opposite to the direction B. Then, the first positioning structures 111 of the device 11 are detached from the second positioning structures 1221 of the wall mount bracket 12 along the direction opposite to the direction A. Accordingly, the device 11 can be detached from the wall mount bracket 12.

According to the wall mount assembly and the wall mount bracket disclosed by the above embodiment, the head portions of the first positioning structures are engaged with the narrow portions of the second positioning structures, respectively, and the blocking portion of the blocking member contacts the side of the device. Thus, the device can be stably mounted on the wall mount bracket. Therefore, an assembling process of the wall mount assembly can be simplified. That is, the assembling process of the wall mount assembly is not required to include complicated assembling steps performed by additional assembling tools. Accordingly, a convenience of an assembly of the wall mount assembly can be improved. In addition, when the device is firmly mounted on the wall mount bracket located on the wall or the ceiling, there is no risk that the assembling tools fall from the wall or ceiling, thereby improving a safety during the assembly of the wall mount assembly.

In addition, since the first bracket, the second bracket and the blocking member are integrally formed as a single piece, it is not required to produce components of the wall mount bracket via additional molds, and the time for assembling the wall mount bracket can be saved. Accordingly, the cost of producing and assembling the wall mount bracket 12 can be reduced.

It will be apparent to those skilled in the art that various modifications and variations can be made to the invention. It is intended that the specification and examples be considered as exemplary embodiments only, with the scope of the invention being indicated by the following claims.

What is claimed is:

1. A wall mount assembly, configured to be disposed on a supporting member and comprising:

a device, comprising a first positioning structure; and a wall mount bracket, comprising:

a first bracket, configured to be disposed on the supporting member;

a second bracket, connected to the first bracket, wherein the second bracket comprises a second positioning structure; and a blocking member, disposed on the first bracket;

wherein the blocking member comprises an extension portion, an elastic arm portion and a blocking portion, an end of the extension portion is connected to the first bracket, another end of the extension portion is connected to an end of the elastic arm portion, another end of the elastic arm portion is connected to the blocking portion, and the blocking portion is configured to block the device;

wherein the first positioning structure is movably disposed on the second positioning structure, when the device is located at a release position, the first positioning structure is detachably disposed at the second positioning structure, and the device presses against the blocking portion of the blocking member to bend the elastic arm portion, when the device is moved from the release position to a fixing position, the blocking member contacts the device, and the first positioning structure is engaged with the second positioning structure.

2. The wall mount assembly according to claim 1, wherein the first positioning structure comprises a head portion, the second positioning structure comprises a wide portion and a narrow portion, the wide portion is connected to the narrow portion, a diameter of the head portion is greater than a diameter of the narrow portion, and is less than a diameter of the wide portion, when the device is located at the release position, the head portion is detachably disposed at the wide portion, when the device is located at the fixing position, the blocking member contacts the device, and the head portion is engaged with the narrow portion.

3. The wall mount assembly according to claim 1, wherein the blocking member of the wall mount bracket further comprises a protruding structure, the protruding structure is located on the extension portion, and protrudes toward the blocking portion.

4. The wall mount assembly according to claim 1, wherein the first bracket of the wall mount bracket comprises a wiring hole, the wiring hole is configured for a cable electrically connected to the device to be disposed therethrough.

5. The wall mount assembly according to claim 1, further comprising a fastener, wherein the first bracket of the wall mount bracket comprises a fastening hole, the fastener is disposed through the fastening hole, and the first bracket of the wall mount bracket is configured to be fixed to the supporting member.

6. The wall mount assembly according to claim 1, wherein the first bracket, the second bracket and the blocking member of the wall mount bracket are integrally formed as a single piece.

7. A wall mount bracket, configured for a device with a first positioning structure, configured to be disposed on a supporting member and comprising:

a first bracket, configured to be disposed on the supporting member;

a second bracket, connected to the first bracket, wherein the second bracket comprises a second positioning structure; and a blocking member, disposed on the first bracket;

wherein the blocking member comprises an extension portion, an elastic arm portion and a blocking portion, an end of the extension portion is connected to the first bracket, another end of the extension portion is connected to an end of the elastic arm portion, another end of the elastic arm portion is connected to the blocking portion, and the blocking portion is configured to block the device;

wherein the first positioning structure is configured to be movably disposed on the second positioning structure, when the device is located at a release position, the first positioning structure is configured to be detachably disposed at the second positioning structure, and the device presses against the blocking portion of the blocking member to bend the elastic arm portion, when the device is moved from the release position to a fixing position, the blocking member contacts the device, and the first positioning structure is configured to be engaged with the second positioning structure.

8. The wall mount bracket according to claim 7, wherein the first bracket, the second bracket and the blocking member are integrally formed as a single piece.

* * * * *